(12) United States Patent
Price

(10) Patent No.: US 8,534,690 B2
(45) Date of Patent: Sep. 17, 2013

(54) HAND PROPELLED AND STEERED BICYCLE

(76) Inventor: David D. Price, Temecula, CA (US)

( * ) Notice: Subject to any disclaimer, the term of this patent is extended or adjusted under 35 U.S.C. 154(b) by 0 days.

(21) Appl. No.: 13/346,306

(22) Filed: Jan. 9, 2012

(65) Prior Publication Data

US 2013/0175781 A1      Jul. 11, 2013

(51) Int. Cl.
*B62M 1/12* (2006.01)
(52) U.S. Cl.
USPC ............................ 280/234; 280/233; 280/247
(58) Field of Classification Search
USPC .............. 280/234, 233, 242.1, 244, 263, 247, 280/248, 249
See application file for complete search history.

(56) References Cited

U.S. PATENT DOCUMENTS

| | | | | |
|---|---|---|---|---|
| 215,876 A * | 5/1879 | Browne | .......................... | 280/234 |
| 645,144 A * | 3/1900 | Tolson | .......................... | 280/240 |
| 1,479,887 A * | 1/1924 | Bitner | ........................... | 280/234 |
| 2,884,259 A * | 4/1959 | Snodgrass | ...................... | 280/234 |
| 3,498,634 A * | 3/1970 | Sheldon | ......................... | 280/212 |
| 5,536,029 A * | 7/1996 | Gramckow | .................... | 280/263 |
| 5,775,708 A * | 7/1998 | Heath | ........................... | 280/234 |
| 7,000,934 B1 * | 2/2006 | Capek | ........................... | 280/234 |
| 7,413,206 B2 * | 8/2008 | Pena et al. | ..................... | 280/246 |
| 2011/0095505 A1 * | 4/2011 | Heath | ........................... | 280/210 |

* cited by examiner

*Primary Examiner* — Anne Marie M Boehler
(74) *Attorney, Agent, or Firm* — John R. Ross; John R. Ross, III

(57) ABSTRACT

A bicycle. A front bicycle wheel and rear bicycle wheel are connected to a bicycle frame. A steerer tube controls the left and right motion of the front bicycle wheel. A drive sprocket drives the rear bicycle wheel. Two hand grippable pivotally connected handles are each connected via a handle steering linkage connection to the steerer tube. They are both also connected via a second handle drive linkage to the drive sprocket. The pivoting of the handles in an approximately horizontal plane controls the left and right motion of the front bicycle wheel. The pivoting of the handles in an approximately vertical plane controls the rotation of the drive sprocket and drives the bicycle forward.

8 Claims, 6 Drawing Sheets

HAND PROPELLED AND STEERED BICYCLE

The present invention relates to bicycles, and in particular, to hand propelled bicycles.

BACKGROUND OF THE INVENTION

Bicycles are well known and are very popular. Bicycles were introduced in the 19th century and now number about one billion worldwide. They are the principal means of transportation in many regions. They also provide a popular form of recreation, and have been adapted for such uses as children's toys, adult fitness, military and police applications, courier services and bicycle racing.

As a form of exercise the bicycle is considered highly desirable. Compared to running it is low impact and therefore not harmful to the joints of the bicycle rider. It provides outstanding cardiovascular fitness. It is also a very exciting form of exercise because the rider can ride his bicycle to interesting places too far away to walk to or jog to.

The avid bicycle rider will eventually develop extremely strong legs as a result of his repeated bicycle workouts. However, a significant fault of the prior art bicycle is that the rider is unable to effectively exercise his arms or chest while riding the bicycle. There have been attempts in the prior art to develop hand propelled bicycles but none of these have been effective or have been accepted by the general population.

What is needed is a better hand propelled and steered bicycle.

SUMMARY OF THE INVENTION

The present invention provides a bicycle. A front bicycle wheel and rear bicycle wheel are connected to a bicycle frame. A steerer tube controls the left and right motion of the front bicycle wheel. A drive sprocket drives the rear bicycle wheel. Two hand grippable pivotally connected handles are each connected via a handle steering linkage connection to the steerer tube. They are both also connected via a second handle drive linkage to the drive sprocket. The pivoting of the handles in an approximately horizontal plane controls the left and right motion of the front bicycle wheel. The pivoting of the handles in an approximately vertical plane controls the rotation of the drive sprocket and drives the bicycle forward.

DETAILED DESCRIPTION OF THE PREFERRED EMBODIMENTS

Figure 1:
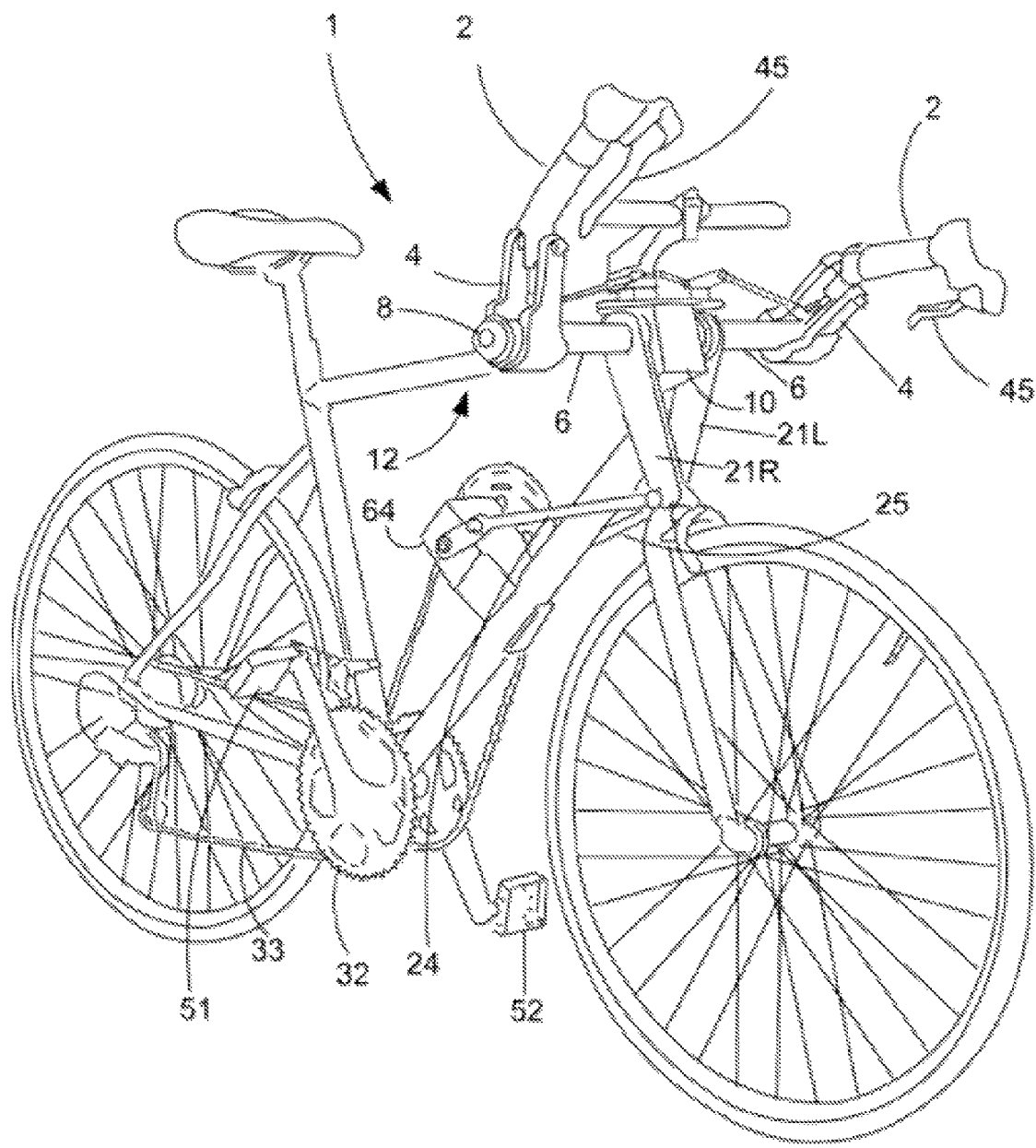
FIG. 1 shows a preferred bicycle.

FIGS. 1-5 show a preferred embodiment of the present invention. As shown in FIG. 1, the rider is able to both steer and propel bicycle 1 by grasping and manipulating handles 2. By utilizing his upper body for propulsion, the rider is able to more effectively exercise his upper body, including his arms and chest. Moreover, because the rider utilizes his legs along with his arms to propel the bicycle, the rider is able to ride faster, more efficiently and for longer distances than he would be able to by utilizing a prior art bicycle that just utilizes legs for propulsion.

A Preferred Embodiment of the Present Invention

Figure 2:
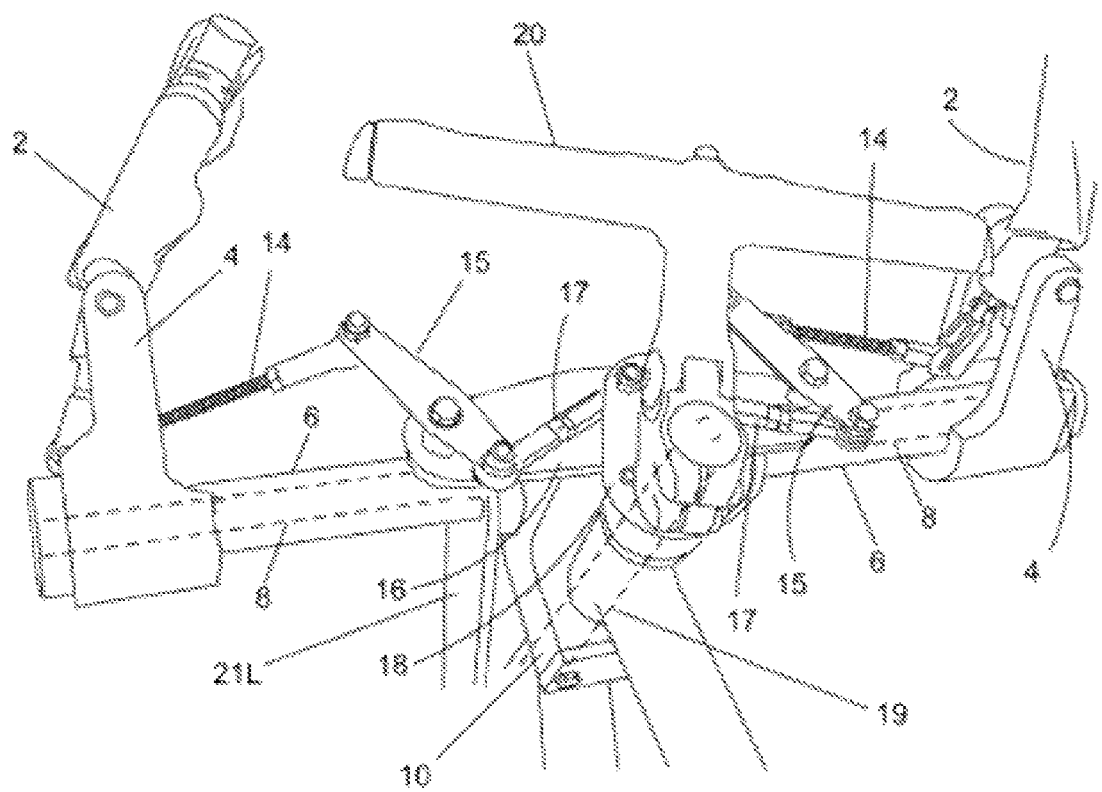
FIGS. 2-3 show details of a preferred steering linkage arrangement.
Figure 3:
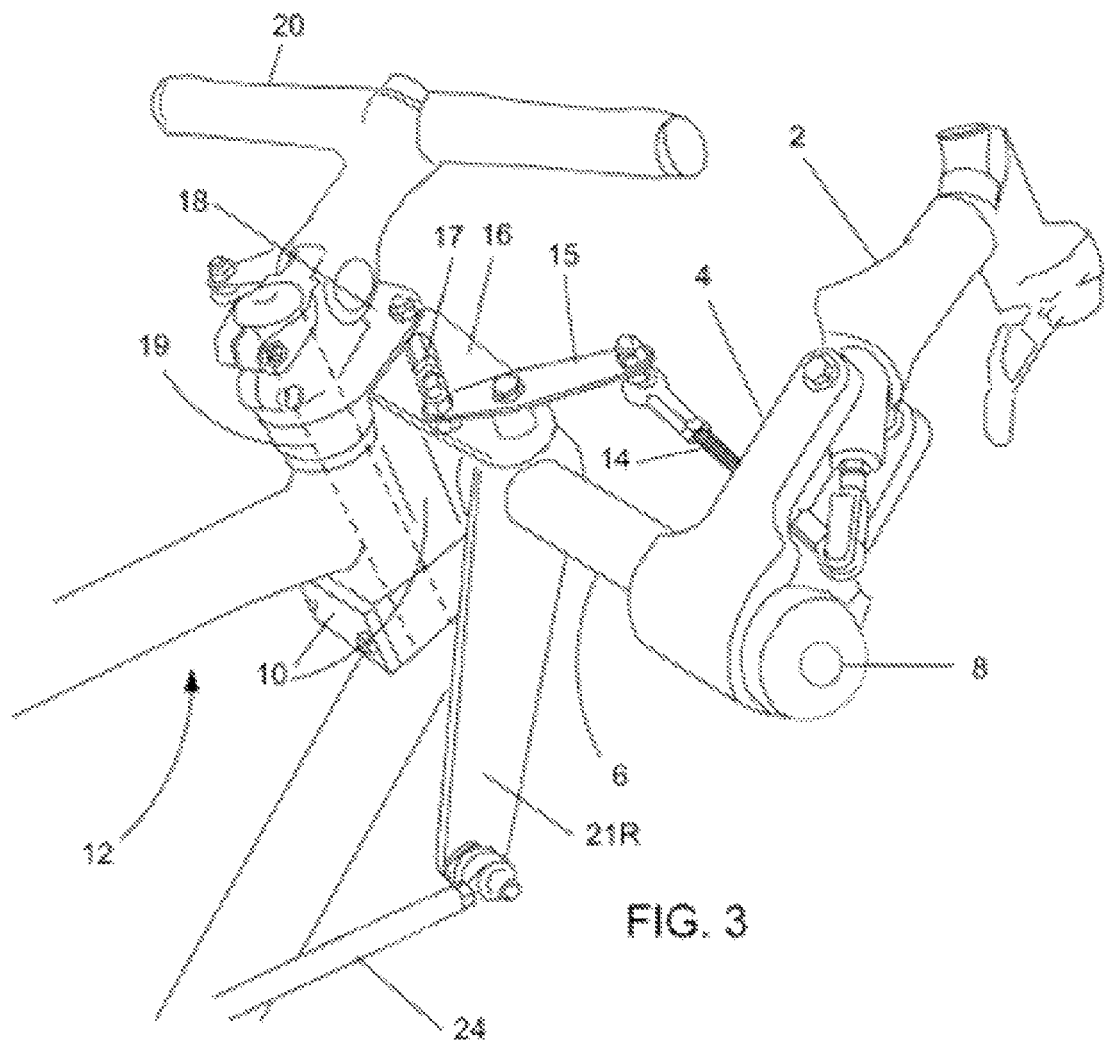

As shown in FIGS. 1-3, each handle 2 is pivotally connected to handle bracket 4. Handle bracket 4 is rigidly attached to rotating shaft 6. Rotating shaft 6 rotates freely on a bearing encircling stationary shaft 8. Stationary shaft 8 extends through rotating shaft 6 and is rigidly attached to frame mount 10. Frame mount 10 is rigidly attached to bicycle frame 12. Each handle 2 is pivotally connected to rod 14. Rod 14 is connected to bell crank 15. Both bell cranks 15 are pivotally connected to bell crank support bracket 16. Bell crank support bracket 16 is rigidly connected to frame mount 10. Rods 17 are pivotally connected to bell cranks 15 and are also both pivotally connected to tiller 18. Tiller 18 is rigidly connected to steerer tube 19 of bicycle 1. In a preferred embodiment of the present invention, bicycle 1 also includes conventional handlebars 20 also connected to steerer tube 19.

Figure 4:
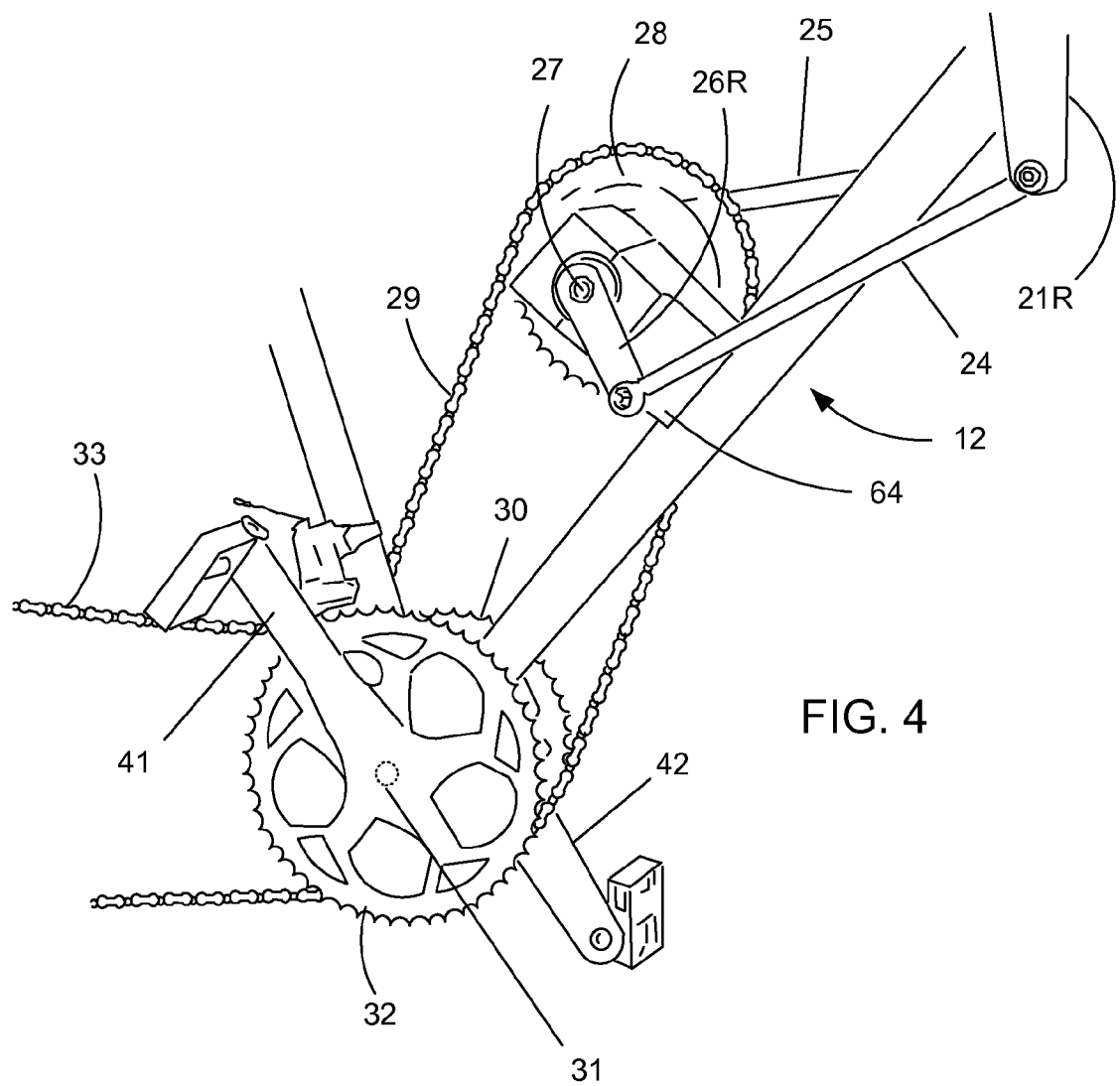
FIGS. 4-5 show details of a preferred propulsion linkage arrangement.
Figure 5:
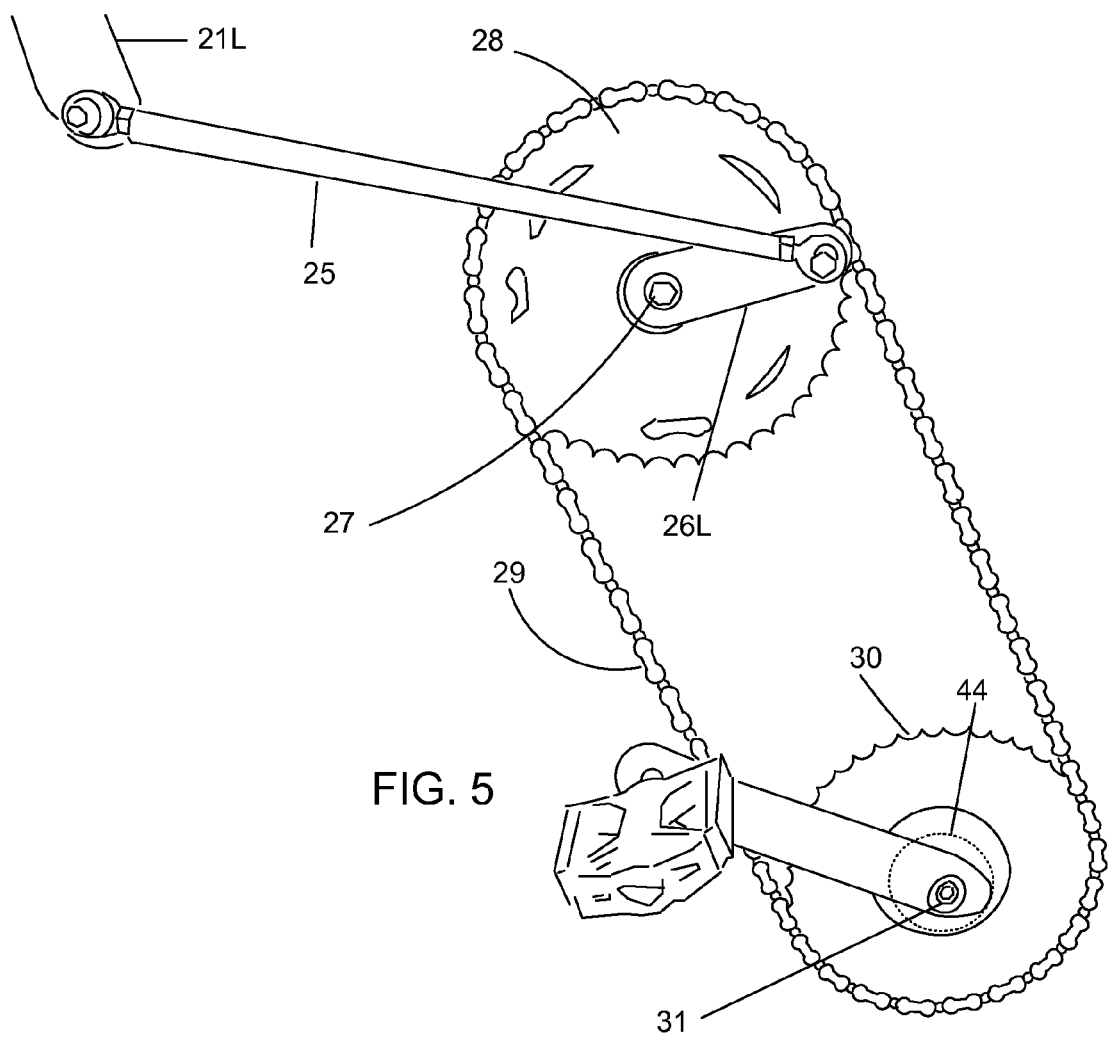

Propulsion levers 21L and 21R are rigidly connected to rotating shafts 6. Propulsion lever 21R is pivotally connected to connecting drive shaft 24. Propulsion lever 21L is pivotally connected to connecting drive shaft 25 (FIG. 5). Upper sprocket 28 is mounted to bicycle frame 12 via upper mount 64 (FIG. 4). Connecting drive shaft 24 is pivotally connected to offset lever 26R (FIG. 4). Offset lever 26R is connected to upper sprocket shaft 27. Upper sprocket shaft 27 is rigidly connected to upper sprocket 28. Connecting drive shaft 25 is pivotally connected to offset lever 26L (FIG. 5) Offset lever 26L is connected to upper sprocket shaft 27. Upper sprocket shaft 27 is rigidly connected to upper sprocket 28 (FIG. 5).

Bicycle chain 29 engages upper sprocket 28 and lower left sprocket 30. Pedal arm 42 is rigidly connected to pedal arm 41 via lower sprocket shaft 31 (FIG. 4). Lower left sprocket 30 is engaged to lower sprocket shaft 31 via one way bearing 44 (FIG. 5). One way bearing 44 disengages the upper sprocket when using legs only for propulsion. Lower right drive sprocket 32 is engaged with rear wheel bicycle drive chain 33 (FIG. 4, FIG. 1).

Using the Arms for Propulsion

To ride bicycle 1, the rider grasps handles 2 and places his feet on pedals 51 and 52 (FIG. 1). The rider may choose to use only his feet for propulsion. As explained above, if the rider uses only his feet for propulsion, chain 29 will disengage due to one way bearing 44.

The rider may decide that he wants to exercise primarily his arms. The rider would then pivot handles 2 back and forth in left and right vertical planes with most of his effort. The pivoting motion of handles 2 would be transferred, through handle brackets 4, through rotating shafts 6, through propulsion levers 21L and 21R, through connecting drive shafts 24 and 25, through chain 29 to rotational motion of lower right drive sprocket 32. Lower right drive sprocket 32 is engaged with the rear wheel bicycle drive chain 33 so that bicycle will therefore move forward. If the user is mostly working with his arms, he will use his legs to a large extent for balance on pedals 51 and 52.

Most riders, it is expected, will tend to naturally split the work evenly between the arms and the legs so that the rotational motion of pedals 51 and 52 and the pivoting motion of handles 2 contribute approximately equally to the rotational motion of lower right drive sprocket 32.

Using the Arms for Steering

To use the arms for steering, the rider grabs handles 2 and pivots them counterclockwise (looking downward) to turn left and pivots them clockwise to turn right. Referring to FIGS. 2 and 3, these pivoting motions are transferred from handles 2 through rod 14, through bell crank 15, through rod 17 to tiller 18. Tiller 18 is connected to steering tube 19 which is connected to the front wheel of bicycle 1.

Conventional Handlebars

In a preferred embodiment of the present invention, conventional handlebars 20 are also connected to steering tube 19. This allows the user to transition back to the convention method of steering a bicycle if his arms get tired. Or it is also useful to a rider who is first learning how to ride bicycle 1. The beginner rider preferably initially starts riding the bicycle while grasping conventional handlebars 20. Then as his confidence increases, the rider preferably places one hand on one of the handles 2. After gaining more confidence, the rider can then place both hands on handles 2. If ever the rider wants to go back to conventional handlebars 20, he may do so. Intermediate or advanced riders of bicycle 1 may opt to not include conventional handlebars 20 attached to bicycle 1 in order to decrease the weight of the bicycle.

Apply Brakes and Shifting Gears

Bicycle 1 includes hand brakes 45 attached to handles 2. Also, bicycle 1 preferably includes conventional gear shifting mechanisms.

Improved Handle Bracket

Figure 6:
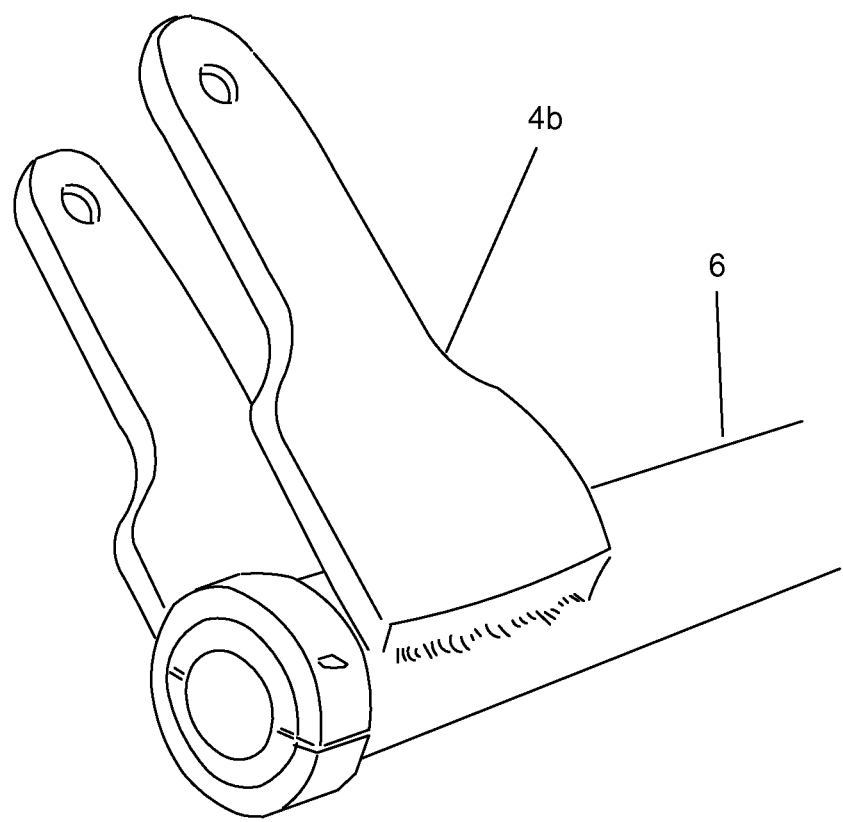
FIG. 6 shows a preferred handle bracket.

FIG. 6 shows an improved handle bracket 4b. Handle bracket 4b is welded onto rotating shaft 6. This allows for less total weight of bicycle 1.

Although the above-preferred embodiments have been described with specificity, persons skilled in this art will recognize that many changes to the specific embodiments disclosed above could be made without departing from the spirit of the invention. For example, it would also be possible to modify the bicycle so that there are two wheels up front and/or two wheels in the rear. The possible configurations would be: 1) one wheel up front, one wheel in the rear (as described above), 2) one wheel up front, two wheels in the rear, 3) two wheels up front, one in the rear, 4) two wheels up front, two wheels in the rear. The embodiments that include additional wheels would make it easier to balance the bicycle. Therefore, the attached claims and their legal equivalents should determine the scope of the invention.

What is claimed is:

1. A bicycle, comprising:
A. a front bicycle wheel,
B. a rear bicycle wheel,
C. a bicycle frame,
D. a steerer tube for controlling the left and right motion of said front bicycle wheel,
E. a first drive sprocket for driving said rear bicycle wheel,
F. a second drive sprocket adapted to drive said first drive sprocket,
G. two hand grippable pivotally connected handles each connected via a handle steering linkage to said steerer tube and each connected via a handle drive linkage to said first drive sprocket, wherein pivoting of said two hand grippable pivotally connected handles in counterclockwise and clockwise directions controls the left and right motion of said front bicycle wheel, and wherein pivoting of said two hand grippable pivotally connected handles in approximately vertical planes controls the rotation of said first drive sprocket and drives said bicycle forward,
H. a handle bracket connected to said handle,
I. a stationary shaft rigidly connected to said bicycle frame,
J. a rotating shaft rigidly connected to said handle bracket and rotating on said stationary shaft,
K. a drive lever rigidly connected to said rotating shaft, and
L. a connecting drive shaft pivotally connected to said drive lever,
M. an upper sprocket,
N. an upper sprocket mount rigidly mounted to said bicycle frame,
O. an upper sprocket shaft extending through said upper sprocket mount and rigidly connected to said upper sprocket,
P. an offset lever rigidly connected to said upper sprocket shaft, wherein one of said connecting shafts is pivotally connected to said offset lever, wherein the other of said connecting shafts is pivotally connected to said upper sprocket,
Q. a bicycle chain engaged with said upper sprocket and said second drive sprocket, and
R. a bicycle drive chain engaged with said first drive sprocket and driving said rear bicycle wheel forward.

2. A bicycle, comprising:
A. a front bicycle wheel,
B. a rear bicycle wheel,
C. a bicycle frame,
D. a steerer tube for controlling the left and right motion of said front bicycle wheel,
E. a first drive sprocket for driving said rear bicycle wheel,
F. a second drive sprocket adapted to drive said first drive sprocket,
G. two hand grippable pivotally connected handles each connected via a handle steering linkage to said steerer tube and each connected via a handle drive linkage to said first drive sprocket, wherein pivoting of said two hand grippable pivotally connected handles in counterclockwise and clockwise directions controls the left and right motion of said front bicycle wheel, and wherein pivoting of said two hand grippable pivotally connected handles in approximately vertical planes controls the rotation of said first drive sprocket and drives said bicycle forward,
H. a handle bracket connected to each one of said handles,
I. a rotating shaft rigidly connected to said handle bracket,
J. a propulsion lever rigidly connected to said rotating shaft,
K. a connecting drive shaft pivotally connected to said propulsion lever,
L. an upper sprocket rotatably connected to said bicycle frame and connected to each of said connecting shafts,
M. a bicycle chain engaged with said upper sprocket and said second drive sprocket, and
N. a bicycle drive chain engaged with said first drive sprocket and driving said rear bicycle wheel forward.

3. The bicycle as in claim 2, further comprising a frame mounted shaft rigidly mounted to said bicycle frame and extending in a right hand direction and a left hand direction, wherein said two hand grippable pivotally connected handles are pivotally connected to said frame mounted shaft.

4. The bicycle as in claim 2, wherein each said handle steering linkage comprises:

A. a first rod pivotally connected to said handle,
B. a bell crank pivotally connected to said first rod,
C. a second rod pivotally connected to said bell crank, and
D. a tiller pivotally connected to said second rod and rigidly connected to said steerer tube.

5. The bicycle as in claim 2, further comprising hand brakes attached to each of said handles.

6. The bicycle as in claim 2, further comprising handlebars connected to said steerer tube.

7. The bicycle as in claim 2, further comprising foot operated pedals connected to said first drive sprocket, where said foot operated pedals work in conjunction with said two hand grippable pivotally connected handles to propel said bicycle forward.

8. The bicycle as in claim 2, wherein said at front bicycle wheel is at least one front bicycle wheel and wherein said rear bicycle wheel is at least one rear bicycle wheel.

* * * * *